(12) United States Patent
Asano (10) Patent No.: US 6,237,661 B1
(45) Date of Patent: May 29, 2001

(54) RUN-FLAT TIRE WITH SPECIFIED PROFILE

(75) Inventor: Kazuo Asano, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/366,649

(22) Filed: Aug. 4, 1999

(30) Foreign Application Priority Data

Aug. 4, 1998 (JP) .................................................. 10-220068
Dec. 4, 1998 (JP) .................................................. 10-346013

(51) Int. Cl.⁷ .............................. B60C 3/00; B60C 11/00; B60C 15/00; B60C 17/00; B60C 9/18
(52) U.S. Cl. .................... 152/209.14; 152/454; 152/517; 152/531; 152/532; 152/533; 152/554
(58) Field of Search ............................. 152/209.14, 454, 152/517, 531, 554, 532, 533

(56) References Cited

U.S. PATENT DOCUMENTS

| | | | |
|---|---|---|---|
| 5,630,892 | * | 5/1997 | Williams et al. ................ 152/209.14 |
| 6,073,668 | * | 6/2000 | Iwasaki et al. .................. 152/454 X |

FOREIGN PATENT DOCUMENTS

| | | | |
|---|---|---|---|
| 0 748 705 A2 | * | 12/1996 | (EP) ...................................... 152/454 |
| 0 778 162 A1 | * | 6/1997 | (EP) .................................. 152/209.14 |
| 53-18104 | | 2/1978 | (JP) . |
| 64-30809 | | 2/1989 | (JP) . |
| 4154411 | | 5/1992 | (JP) . |
| 8-337101 | * | 12/1996 | (JP) .................................. 152/209.14 |

* cited by examiner

Primary Examiner—Adrienne C. Johnstone
(74) Attorney, Agent, or Firm—Birch, Stewart, Kolasch & Birch, LLP

(57) ABSTRACT

A run-flat tire comprises a carcass ply extending between the bead portions, and a sidewall reinforcing layer disposed axially inside said carcass ply in each sidewall portion, wherein in a normally inflated unloaded state, a profile line from a tire equator point (P) to a maximum tire section width point (D) is curved substantially along an involute curve so as to have a radius of curvature decreasing continuously from the tire equator point towards the sidewall portion, the basic circle of the involute curve is an ellipse whose major axis extends in the tire radial direction, the radial distance (h) between the tire equator point (P) and the maximum tire section width point (D) is more than 34% but less than 50% of the tire section height (H). In a x-y coordinate system which is defined in a meridian section of the tire such that: y-axis extends radially outwardly on the tire equator; x-axis extends axially outwardly in the tire axial direction; the x-y coordinates of said tire equator point (P) is (0, B); B is a radius of curvature of the profile line at the tire equator point (P), the elliptic function of the ellipse is $$\frac{(x-a)^2}{a^2} + \frac{y^2}{b^2} = 1$$

wherein $0<a<b$.

6 Claims, 8 Drawing Sheets

RUN-FLAT TIRE WITH SPECIFIED PROFILE

BACKGROUND OF THE INVENTION

1. Field of the Invention

The present invention relates to a pneumatic tire, more particularly to a run-flat tire having an improved tire profile capable of improving run-flat performance of the tire without sacrificing running performance under normal conditions.

2. Description of Related Art

Recently, there is a strong demand for run-flat tires capable of running safely for a certain distance at a usual speed, for example, at a speed of 80 km/h for at least 80 km distance.

Hitherto, widely employed as a means of providing ability to run under flat conditions is to dispose a reinforcing rubber layer in each sidewall portion of a conventional type pneumatic tire. Such tires are disclosed in the laid-open Japanese patent applications JP-A-53-18104, JP-A-64-30809, JP-A-4-154411 for examples.

In such tires, however, it is difficult to satisfy the above-mentioned requirements, at least 80 km distance at 80 km/h, because the sidewall reinforcing layer is inevitably increased in the thickness, volume and weight. And when such a great mass of sidewall reinforcing rubber layer is disposed, tire performance under normally inflated conditions is liable to deteriorate. For example, the tire weight and rolling resistance increase, and fuel consumption of vehicles is increased, and further the ride comfort is not good, and furthermore belt edge loose is liable to occur to decrease the durability.

BRIEF SUMMARY OF THE INVENTION

It is therefore, an object of present invention to provide a run-flat tire in which run-flat performance is improved and at the same time the above-mentioned problems can be solved.

According to one aspect of the present invention, a run-flat tire comprises a tread portion, a pair of sidewall portions, a pair of bead portions with a bead core therein, a carcass comprising a carcass ply extending between the bead portions, and a sidewall reinforcing layer disposed axially inside the carcass ply in each of the sidewall portions, and in a normally inflated unloaded state, a profile line from a tire equator point in the tread portion to a maximum tire section width point in each sidewall portion is curved substantially along an involute curve so as to have a radius of curvature decreasing continuously from the tire equator point towards the sidewall portion, wherein the basic circle of the involute curve is an ellipse whose major axis extends in the tire radial direction, the radial distance between the tire equator point and the maximum tire section width point is more than 34% but less than 50% of the tire section height.

BRIEF DESCRIPTION OF THE DRAWINGS

Embodiment of the present invention will now be described in detail in conjunction with the accompanying drawings.

DETAILED DESCRIPTION OF THE INVENTION

In FIGS. 1–5, a run-flat tire according to the present invention comprises a tread portion 2, a pair of sidewall portions 3, a pair of bead portions 4 with a bead core 5 therein, a carcass 6 extending between the bead portions 4, and a belt 7, 9 disposed radially outside the carcass 6 in the tread portion 2.

Figure 1:
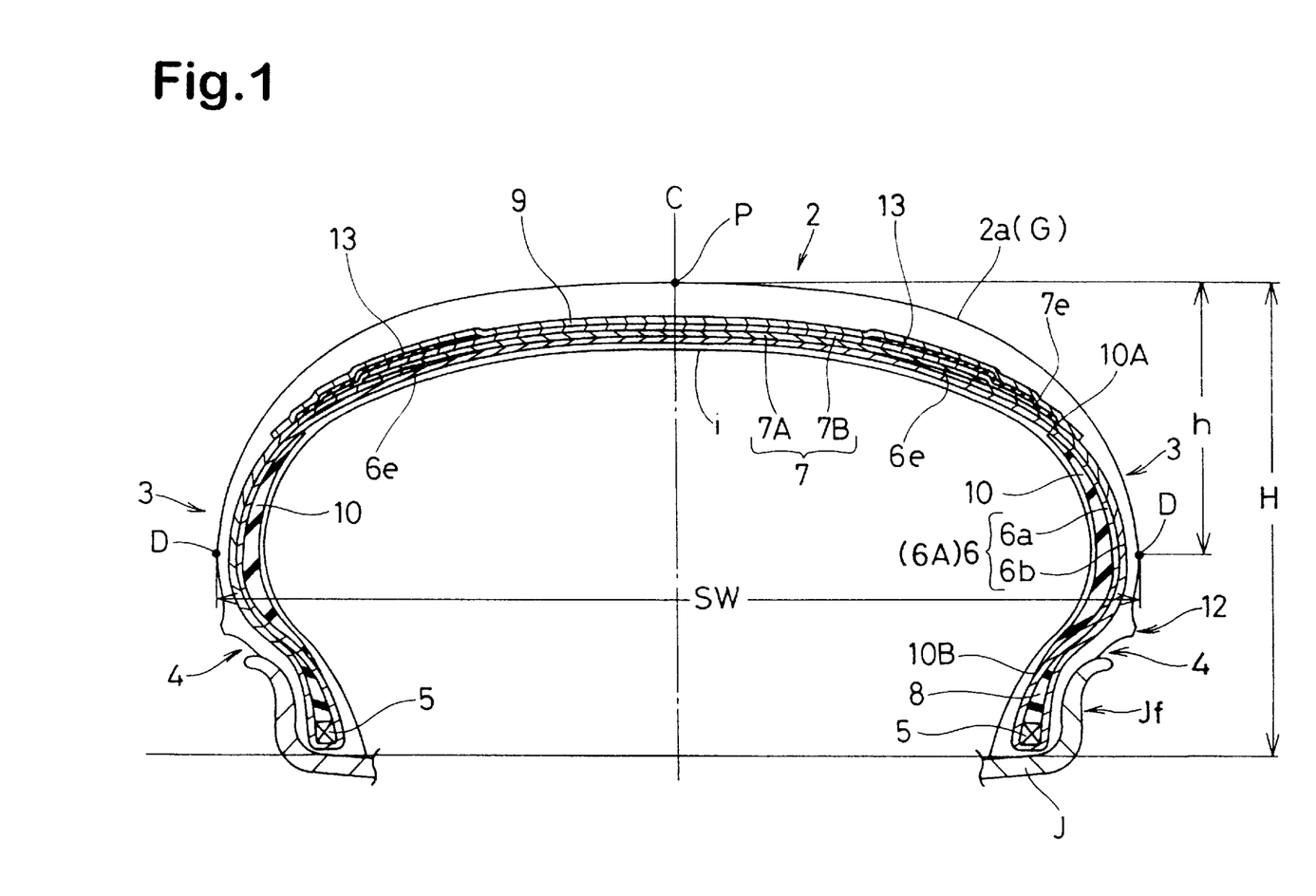
FIG. 1 is a cross sectional view of a run-flat tire according to the present invention.

In this embodiment, the tire is for passenger cars, and FIG. 1 shows a meridian section of the tire which is mounted on a standard rim J and inflated to a standard pressure but loaded with no tire load. (hereinafter normally inflated unloaded state)

Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. However, if the tire is for passenger cars, 180 kPa is used as the standard pressure. The standard load is the "maximum load capacity" in JATMA, the "Load Capacity" in ETRTO, the maximum value given in the above-mentioned table in TRA or the like.

The carcass 6 comprises at least one carcass ply 6A extending between the bead portions 4 through the tread portion 2 and sidewall portions 3 and turned up around the bead core 5 from the axially inside to the outside of the tire to form a pair of turnup portions 6b and a main portion 6a. The carcass ply 6A is composed of organic fiber cords, e.g. nylon, polyester, rayon, aromatic polyamide and like arranged radially at an angle of from 70 to 90 degrees with respect to tire equator C and rubberized with a topping rubber. In this embodiment, the carcass 6 is composed of one ply 6A of cords arranged radially at 90 degrees.

Between the turnup portion 6b and main portion 6a in each of the bead portions 4, a bead apex 8 is disposed to increase the bending rigidity. The bead apex 8 is made of hard rubber tapering and extending radially outwardly from the bead core 5.

The above-mentioned carcass ply turnup portion 6b extends radially outwardly beyond the radially outer end of the bead apex 8.

Further, in each of the sidewall portions 3, a sidewall reinforcing layer 10 is disposed axially inside the carcass 6 to increase the bending rigidity. This layer 10 is made of rubber having a crescent shape tapering radially outwards and inwards. The maximum thickness occurs near the maximum tire section width point D. As shown in FIG. 1, the radially inner end 10B of the sidewall reinforcing layer 10 overlaps the radially outer end of the bead apex rubber 8. In order to assist this sidewall reinforcing rubber layer 10, a reinforcing layer made of rubberized cords may be disposed. Furthermore, a reinforcing cord layer may be disposed as the sidewall reinforcing layer 10 instead of the rubber layer.

Figure 2:
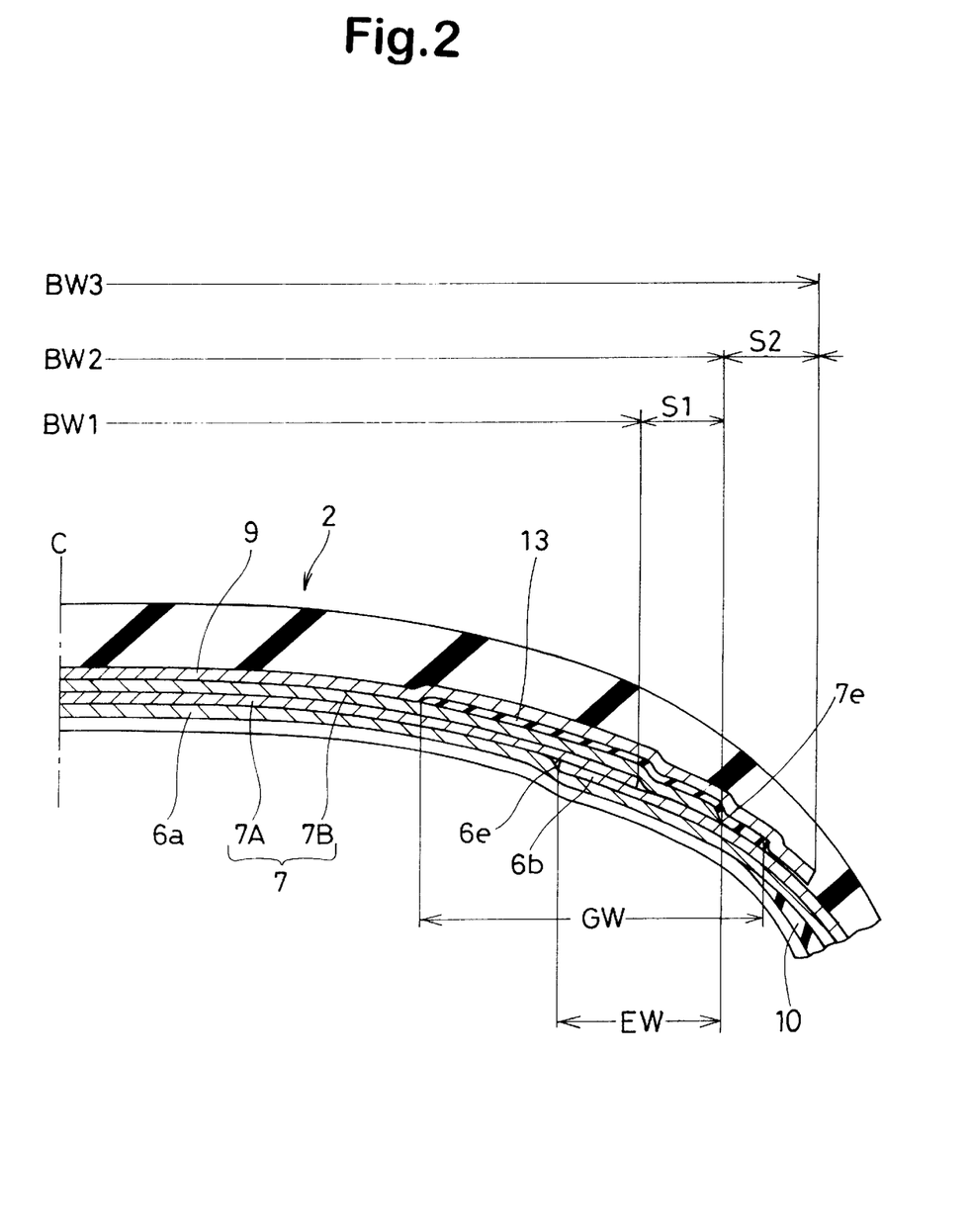
FIG. 2 is an enlarged cross sectional view of the belt thereof.

The above-mentioned breaker 7 comprises at least two cross plies of parallel cords laid at an angle of 10 to 35 degrees with respect to the tire equator. For the breaker cords, steel cords, and high modulus organic fiber cords such as aramid, rayon and like can be used. In this embodiment, the breaker is composed of a radially inner first ply 7A and a radially outer second ply 7B each made of steel cords.

Meanwhile, a cause of tire burst during run-flat is a belt edge loose, namely a separation of belt cords from the surrounding rubber. Thus, it is very important for improving run-flat performance to control the belt edge loose.

Figure 8A:
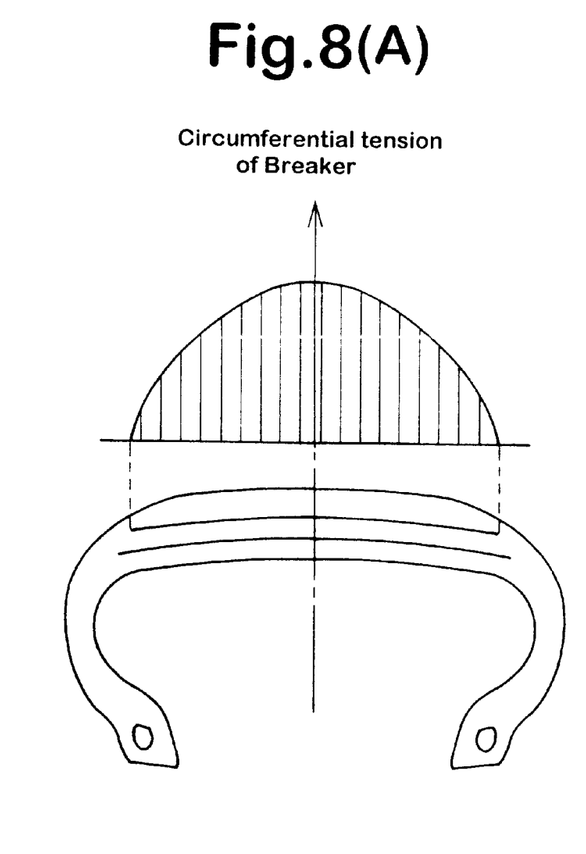
FIG. 8(A) and FIG. 8(B) show axial distributions of circumferential tension of a breaker.
Figure 8B:
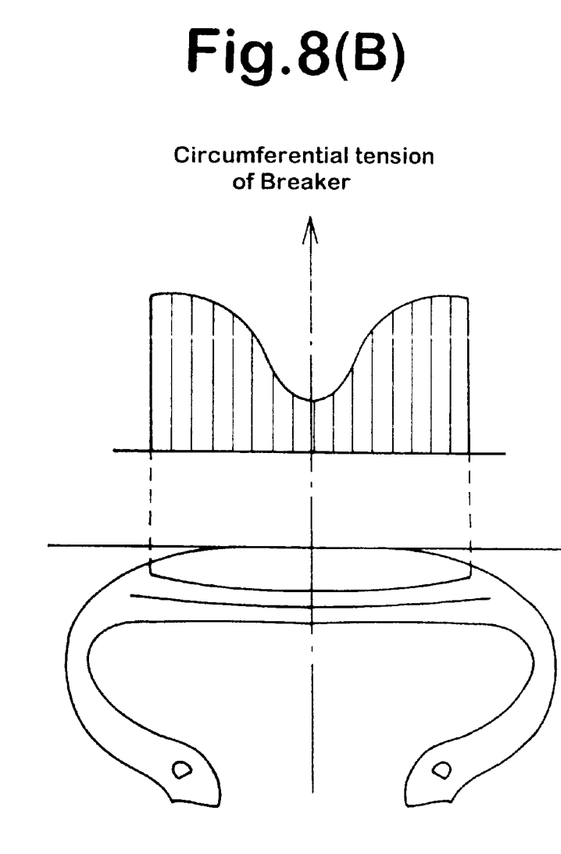

In general, as shown in FIG. 8(A) and FIG. 8(B), the distribution of the circumferential tension of the breaker greatly alters between the ground contacting patch (FIG. 8(B)) and other place (FIG. 8(A)), and a relatively large shear stress occurs between cross plies in the breaker edges. Thus, belt edge loose is caused.

In the present invention, firstly, the radially outer breaker ply 7B is extended into the sidewall portions 3 beyond the ends of the radially inner breaker ply 7A. Therefore, the ends of the inner breaker ply 7A are covered by the outer breaker ply 7B, and occurrence of belt edge loose therefrom can be prevented. Preferably, the axial distance S1 between the ply ends is not less than 5 mm, in other words, the difference BW2-BW1 between the axial width BW2 of the radially outer breaker ply 7B and the axial width BW1 of the radially inner breaker ply 7A is not less than 10 mm.

Further, in this example, the axial end 7e of the breaker 7 overlaps the above-mentioned carcass ply turnup portions 6b which is extended into the tread portion 2. and the radially outer end 6e of the turnup portions is secured between the breaker 7 and the carcass main portion 6a. The overlap EW of the carcass turnup portion and breaker measured in the tire axial direction is more than 5 mm, preferably more than 10 mm, more preferably in the range of from 15 to 25 mm. Therefore, the sidewall portion 3 can be effectively reinforced by the minimum carcass ply number, which also helps to decrease the thickness or weight of the sidewall reinforcing layer 10.

Furthermore, in this example, a band 9 which comprises one or two, preferably one cord ply is disposed radially outside the breaker 7. The axial width BW3 of the band 9 is set to be larger than the width BW2 of the widest breaker ply 7B so that the ends of the widest breaker ply 7B are covered by the band 9 to prevent the occurrence of belt edge loose from these ends. The axial difference S2 between the ends of the band 9 and the widest breaker ply 7B is preferably not less than 10 mm. In this embodiment, the band 9 is formed by spirally winding a tape of rubber in which a single cord or parallel cords are embedded along the length thereof. Accordingly, the band 9 is composed of one or more spiral cords. It may be also possible to form the band by winding a full-width strip of rubberized parallel cords. For the band cords, organic fiber cords, e.g. aramid, nylon, polyester, rayon and like, and steel cords can be used. In this embodiment, two parallel aramid cords are used. In any case, the band cord or cords or windings are arranged substantially parallel with the circumferential direction of the tire. The belt end, in this example band end overlaps the radially outer end 10A of the above-mentioned sidewall reinforcing layer 10.

In each tire shoulder region, a rubber strip 13 having a thickness of less than 1.5 mm is disposed between the breaker 7 and band 9. Each rubber strip 13 extends from the axially inside to the axially outside of the breaker end 7e. The axial width GW thereof is preferably set in the range of from 8 to 30% of the tire section width SW. In case of passenger car tires, the width Gw is more than 20 mm, preferably more than 30 mm, in this example 50 mm. Thereby, a share stress between the band 9 and breaker 7 is mitigated and a ply separation failure can be further prevented.

Figure 3:
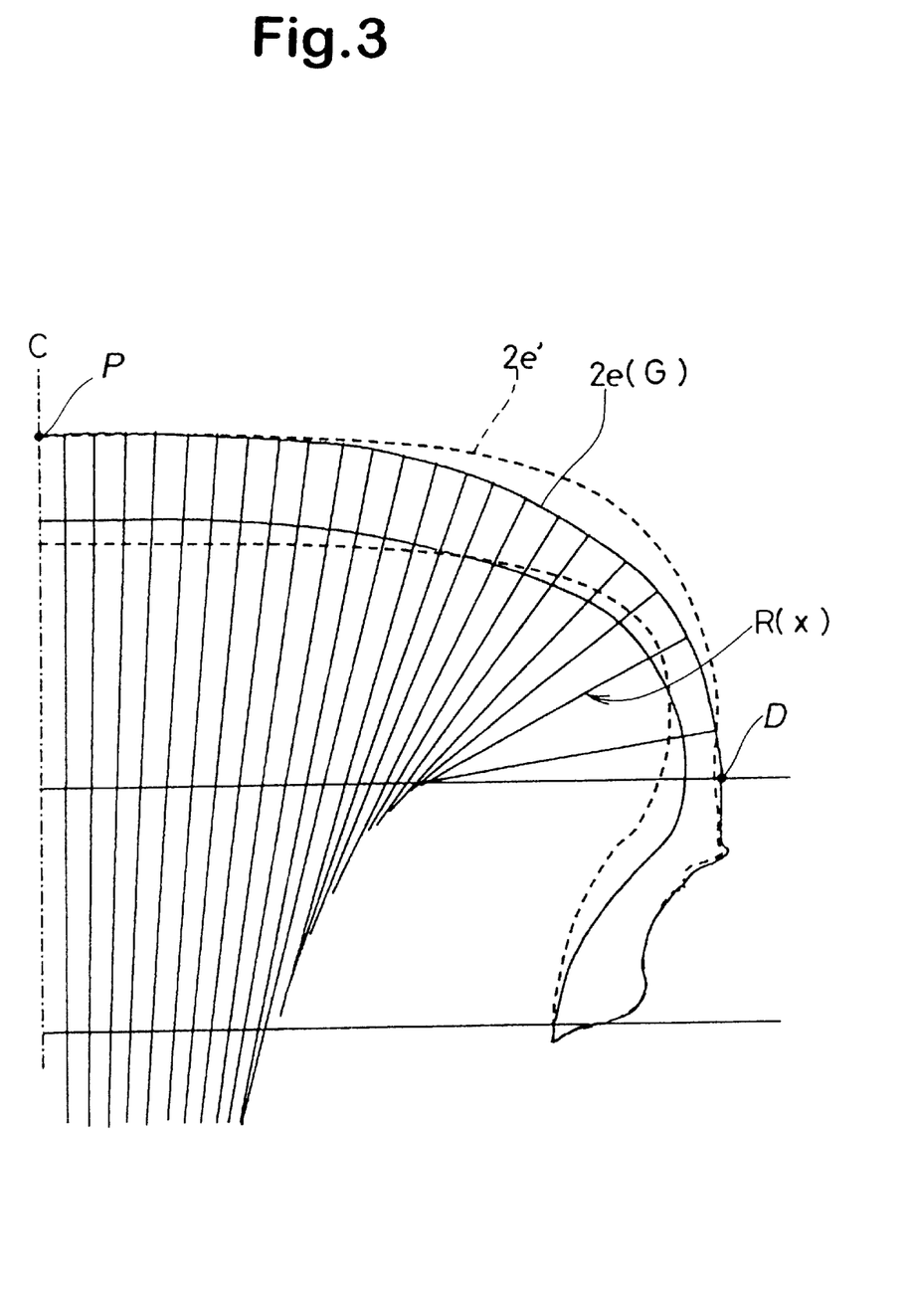
FIG. 3 is a schematic cross sectional view of the tire for explaining a profile line of the tire.
Figure 4:
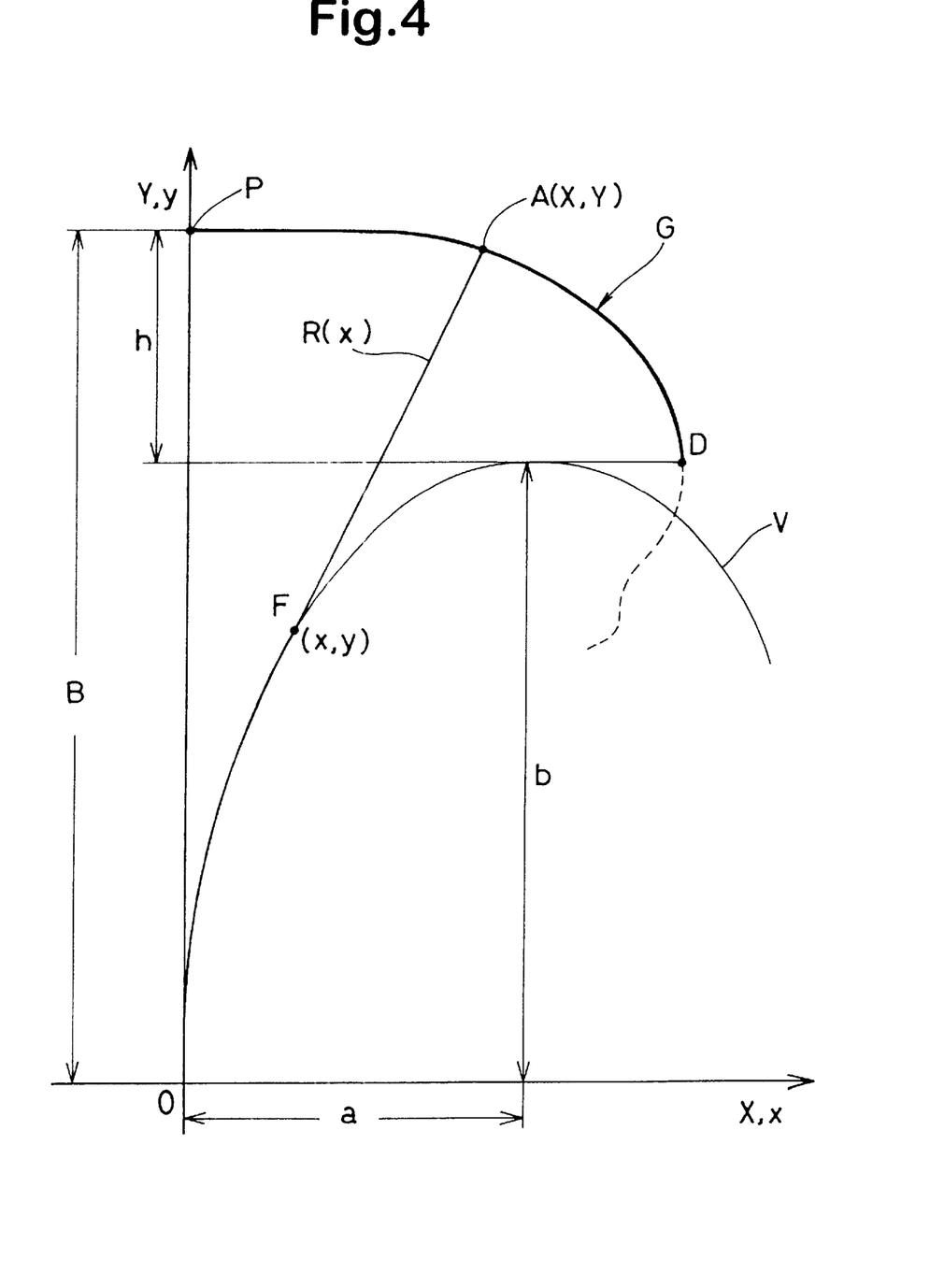
FIG. 4 is a diagram for explaining an involute curve defining the profile line.

In a meridian section of the tire under the normally inflated unloaded state, as shown in FIG. 3 and FIG. 4, the profile line of the tire is symmetrical about the tire equator C, and a profile line 2e on each side of the tire equator C defined as extending from the tire equator point P in the tread portion 2 to the maximum tire section width point D in the sidewall portion 3 is formed by an involute curve G so as to decrease the radius of curvature thereof gradually and continuously from the tire equator point P towards the sidewall portion. Incidentally, an involute curve is the locus described by one end of a fixed length thread of which other end is fixed to the origin when the thread is wound around a basic circle without slack.

In this embodiment, the base circle is an ellipse V.

When a x-y coordinate system is defined as shown in FIG. 4, the elliptic function of the ellipse V is $$\frac{(x-a)^2}{a^2} + \frac{y^2}{b^2} = 1$$

wherein $0 < a < b$.

In this x-y coordinate system, the y-axis is on the tire equator, and the x-axis is on an axial line, and the origin O is radially inward of the tire equator point P by a distance B.

Accordingly, the minor axis (length=a×2) of the ellipse V extends on the x-axis, and the major axis (length=b×2) thereof extends in the radial direction, and the coordinates of the equator point P is (0, B).

The radial distance (h) between the equator point P and the maximum width point D is set in the range of more than 34% but less than 50% of the tire section height H. The minor axis length (a×2) of the ellipse V is set in the range of from 53 to 89% of the tire section width SW. And in this example, the major axis length (b×2) is equal to the length in the y-axis (radial) direction between the origin O and the maximum width point D. Accordingly, b=B−h.

If the distance h is 34% or less, the ride comfort and tire weight reduction deteriorate. If the distance h is 50% or more, a camber thrust increases and the wandering performance deteriorates.

As the tread portion 2 is relatively round, its effect on the vertical spring constant of the tire under the normal state increases. As a result, the vertical spring constant is decreased to improve the ride comfort. Further, the length along the profile line 2e from the tire equator point P to the maximum width point D becomes shorter than that of conventional tires. Especially, the sidewall portion becomes short. As a result, the rubber volume decreases and the tire weight can be reduced. Further, the ground pressure distribution can be evened.

The coordinates (X, Y) of a point (A) on the profile line 2e can be expressed as a function of x as follows.

$$Y(x) = y(x) + R(x)\sin[\tan^{-1}\{y'(x)\}]$$

$$X(x) = x + R(x)\cos[\tan^{-1}\{y'(x)\}]$$

wherein $$y(x) = b\sqrt{1 - \frac{(x-a)^2}{a^2}}$$

$$y'(x) = -\frac{b^2(x-a)}{y \cdot a^2}$$

$$R(x) = B - s(x)$$

$$s(x) = \int_0^x \sqrt{(1 + y'(x)^2)} \, dx$$

$s(x)$ gives a length measured along the ellipse V from the origin O to a point F(x, y).

$R(x)$ gives a radius of curvature of the profile line 2e.

As explained above, the profile line 2e, that is, the contour of the outside of the tire is defined by an involute curve. In the present invention, further, the contour of the inside of the tire is also defined as follow.

Figure 5:
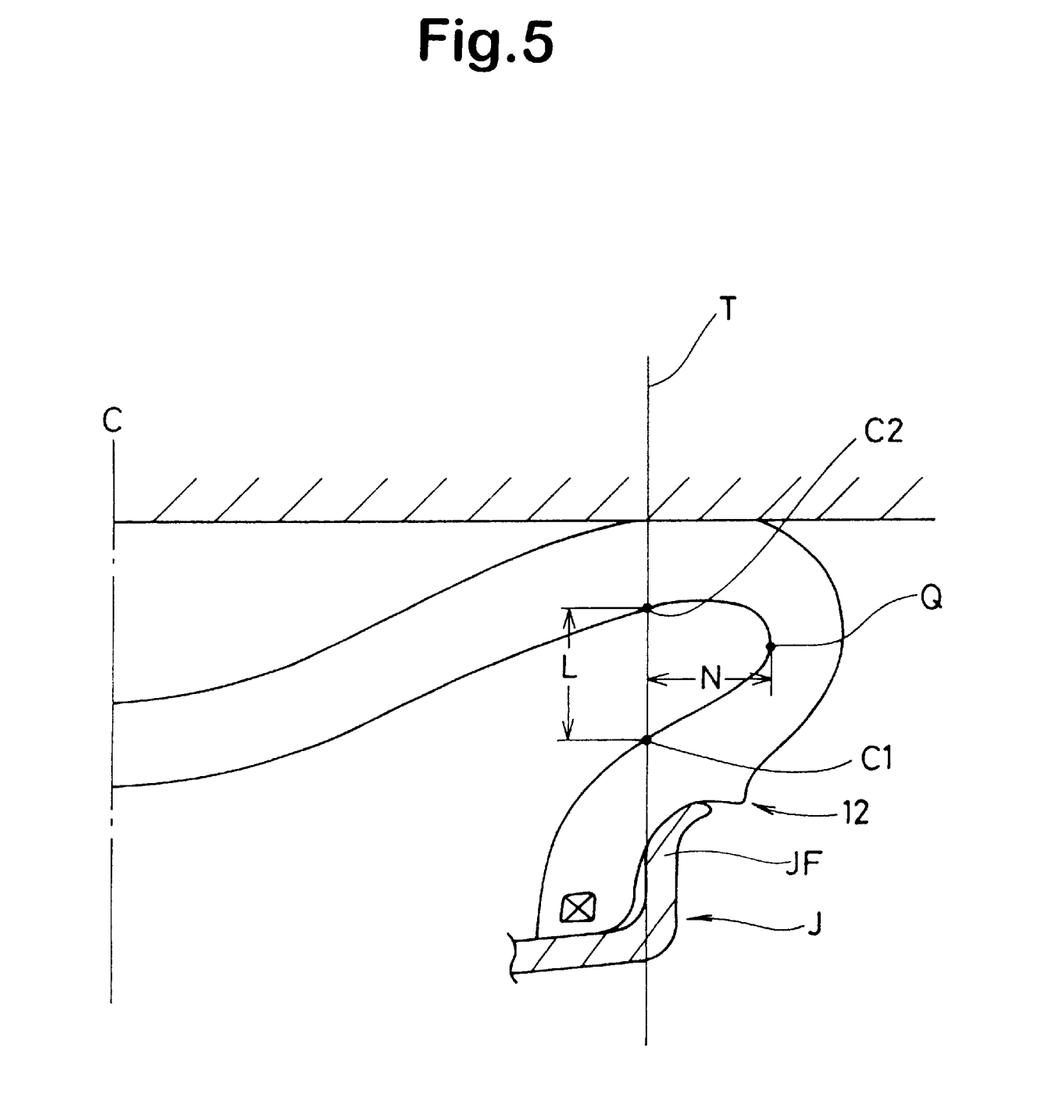
FIG. 5 is a schematic cross sectional view of the run-flat tire under a flat condition reproduced by removing the tire valve core and loading with a standard load.

As shown in FIG. 5, when the tire is mounted on the above-mentioned standard wheel rim J and loaded with the standard load, and the air is released by pulling out the tire valve core (hereinafter flat state), the inside of the tire is curved such that a radial line T passing an axial position corresponding to the width of the standard wheel rim J intersects the inside of the tire at a radially inner point C1 and a radially outer point C2 twice, and the ratio L/N of the distance L between the two points C1 and C2 and the axial distance N from the radial line T to the axially outermost point Q on the inside of the tire is more than 0.95 but less than 3.0, preferably from 1.0 to 2.0.

Run-flat Performance Test

The test tires were mounted on all the four wheels of a Japanese FF passenger car, and the tire valve cores were pulled out, and then the test car was run in a test circuit course to measure a runable distance.

Running speed: 80 km/h (straight), 60 km/h (corner)

Tire load: 300 kgf

The measured runable distance is indicated in Table 1 by an index based on Ref.5 being 100. The larger the index, the better the performance.

Tire Weight

The tire weight is indicated in Table 1 by an index based on Ref.5 being 100.

Ride Comfort and Steering Stability Tests

The test tires were mounted on all the four wheels of a Japanese FF passenger car, and the test car was run on various road surfaces under the normal state inflated to the standard inner pressure, and the ride comfort and steering stability were evaluated by the test driver's feeling. The results are indicated by an index based on Ref. 5 being 100. The larger the index, the better the performance.

Durability Test

Using a tire test drum having a diameter of 1.7 m, the test tire was continuously run at a speed of 80 km/h to obtain the runable time until a belt edge loose was caused. The used wheel rim was the standard rim and the tire pressure was the standard pressure. But, the tire load was increased to 140% of the standard load. The result are indicated in Table 1 by an index. The larger index, the better the durability.

TABLE 1

| Tire | Ex. 1 | Ex. 2 | Ex. 3 | Ref. 1 | Ref. 2 | Ref. 3 | Ref. 4 | Ref. 5 | Ex. 4 | Ex. 5 | Ref. 6 |
|---|---|---|---|---|---|---|---|---|---|---|---|
| Band width (mm) | 184 | 184 | 184 | 184 | 184 | 184 | 184 | — | 184 | — | — |
| First breaker width (mm) | 144 | 144 | 144 | 144 | 144 | 144 | 144 | 144 | 158 | 158 | 158 |
| Second breaker width (mm) | 158 | 158 | 158 | 158 | 158 | 158 | 158 | 158 | 144 | 144 | 144 |
| Rubber strip width (mm) | 50 | 50 | 50 | 50 | 50 | 50 | 50 | 0 | 50 | 0 | 50 |
| Ellipse | | | | | | | | | | | |
| a (mm) | 54.2 | 54.2 | 79.3 | 62.3 | 49.6 | 54.2 | 82.6 | — | 54.1 | 54.1 | 54.1 |
| b (mm) | 324.5 | 324.5 | 339.8 | 329.6 | 321.5 | 329.5 | 341.8 | — | 324 | 324 | 324 |
| L/N | 0.966 | 2.953 | 1.95 | 0.85 | 0.801 | 3.21 | 0.52 | 0 | 0.964 | 0.964 | 0.843 |
| h/H | 0.496 | 0.496 | 0.347 | 0.446 | 0.526 | 0.496 | 0.326 | — | 0.491 | 0.491 | 0.494 |
| Test results | | | | | | | | | | | |
| Run-flat performance | 150 | 750 | 110 | 20 | 200 | 840 | 120 | 3 | 101 | 101 | 52 |
| Tire weight | 97 | 106 | 107 | 90 | 88 | 112 | 125 | 100 | 97 | 97 | 88 |
| Ride comfort | 95 | 90 | 82 | 100 | 110 | 85 | 92 | 100 | 95 | 95 | 96 |
| Steering stability | 99 | 97 | 97 | 95 | 90 | 98 | 99 | 100 | 99 | 99 | 98 |
| Durability | 100 | 100 | 100 | 100 | 100 | 100 | 100 | 100 | 90 | 88 | 85 |

Tire section height H: 101.75 mm
Radius of curvature at point P: 375 mm (B = 375)

If the ratio (L/N) is 0.95 or less, a large stress occurs on the inside of the sidewall portion, and this portion is liable to be damaged. If the ratio (L/N) is 3.0 or more, the ride comport deteriorates and such tire tends to increase the weight.

In this embodiment, further, in order to prevent unseating, the outer surface of a lower sidewall potion radially inward of the maximum width point D is provided with an axially protruding rib 12 so as to overhang the flange Jf of the standard rim J.

Comparison Tests

Test tires of size 185/55R14 having specifications shown in Table 1 were made and tested for the run-flat performance, tire weight, ride comfort, steering stability and durability.

From the test results, it was confirmed that Example tires according to the present invention can be improved in the run-flat performance, resistance to the belt edge loose and the like without greatly increasing the tire weight although the tires can be used with the standard wheel rim.

Figure 6A:
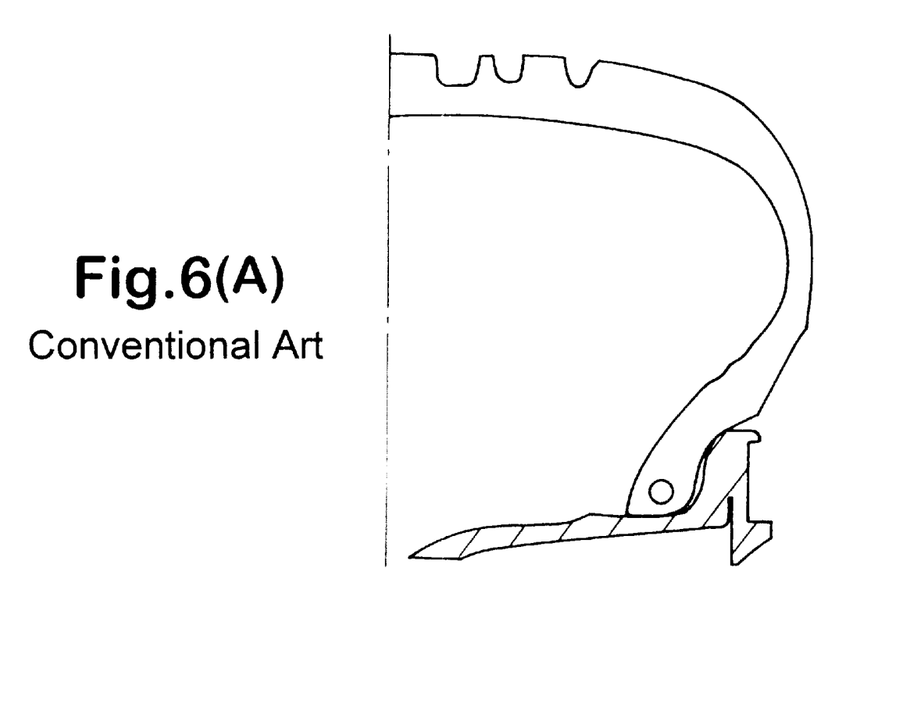
FIG. 6(A) is a schematic cross sectional of a conventional tire under normal state.
Figure 6B:
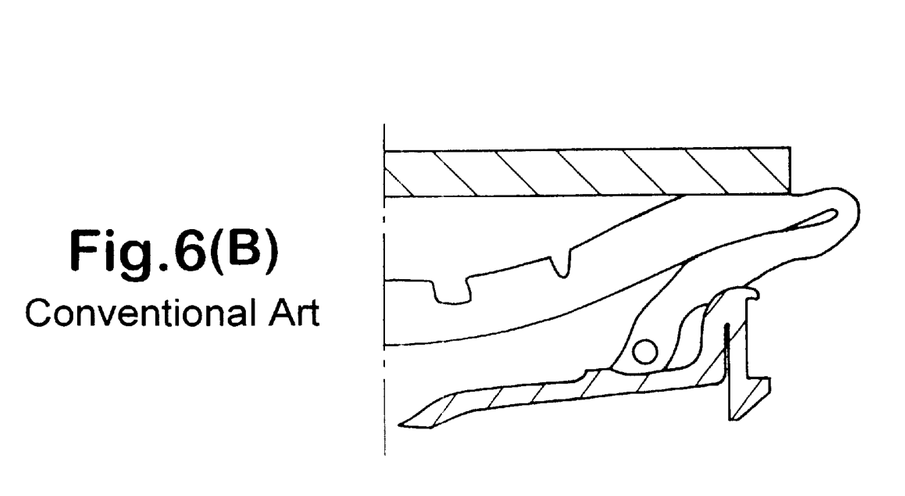
FIG. 6(B) is a schematic cross sectional of the conventional tire under a flat condition reproduced by the same way as in FIG. 5.

FIG. 6(A) shows the normal state of Ref. 5. FIG. 6(B) shows a state of Ref. 5 from which the tire valve core was removed.

Figure 7:
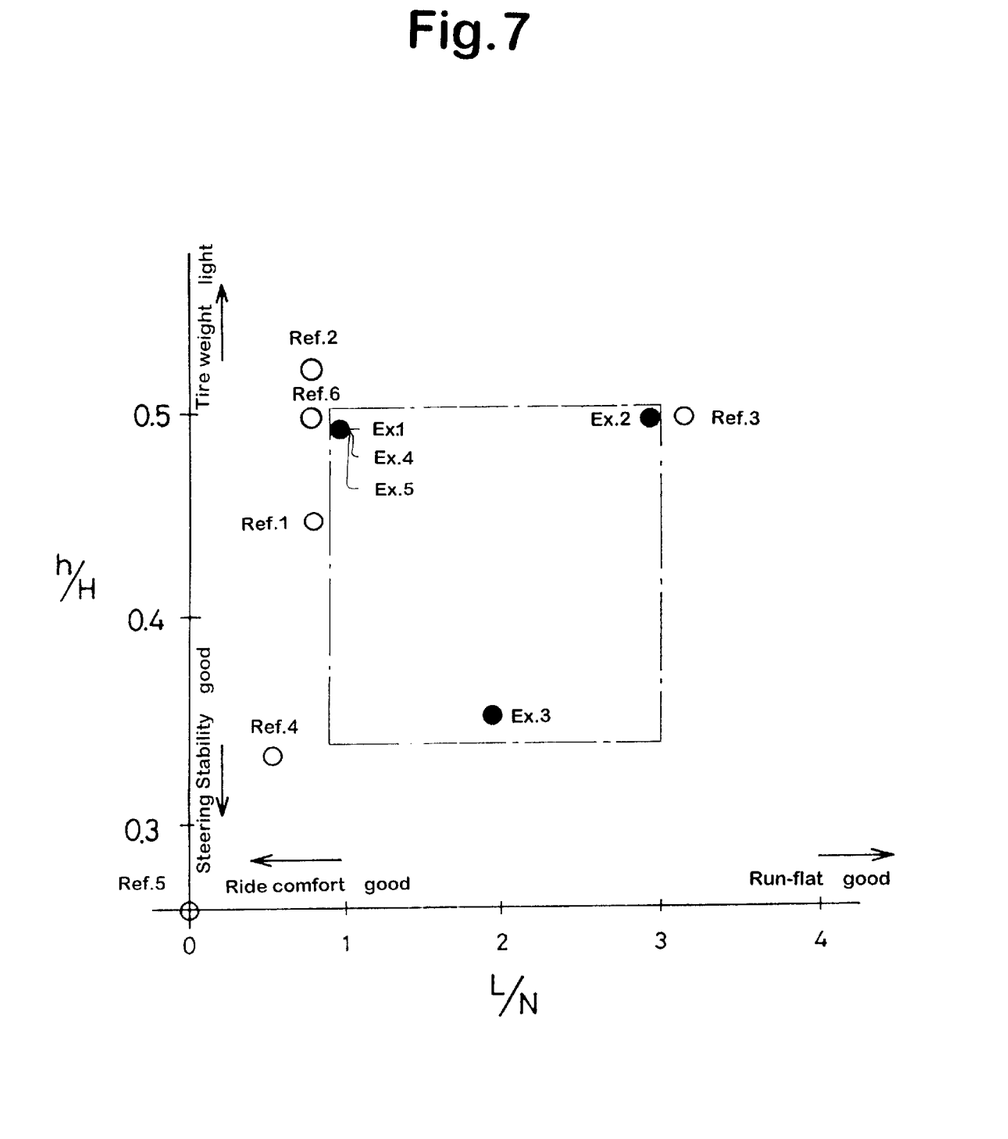
FIG. 7 is a graph in which test tires are protted.

FIG. 7 is a graph in which the ratio (L/N) and the ratio (h/H) of the test tires are plotted, wherein
the larger the ratio (h/H), the better the weight reduction;
the smaller the ratio (h/H), the better the steering stability;
the smaller the ratio (L/N), the better the ride comfort; and
the larger the ratio (L/N), the better the run-flat performance.

As described above, in the run-flat tire according to the present invention, due to the multiplier effect of the specific tire profile and reduced sidewall reinforcing layer, run-flat performance can be effectively improved without sacrificing the tire performances under normal conditions.

The present invention can be suitably applied to pneumatic tires for passenger cars, but it is also possible to apply to tires of other categories such as RV, LT and the like except for motorcycles. Meanwhile, it is not always necessary that the profile line 2e completely or strictly coincides with the involute curve G. Some degree of tolerance is of course allowed. Therefore, within the allowable tolerance range, a multi-radius curve approximating the involute curve G can be used.

What is claimed is:

1. A run-flat tire comprising
   a tread portion,
   a pair of sidewall portions,
   a pair of bead portions with a bead core therein,
   a carcass comprising a carcass ply extending between the bead portions, and
   a sidewall reinforcing layer disposed axially inside said carcass ply in each said sidewall portion, wherein
   in a normally inflated unloaded state in which the tire is mounted on a standard rim and loaded with the standard load and inflated to a standard pressure, a profile line from a tire equator point (P) in the tread portion to a maximum tire section width point (D) in each said sidewall portion is curved substantially along an involute curve so as to have a radius of curvature decreasing continuously from the tire equator point towards the sidewall portion,
   the basic circle of the involute curve is an ellipse whose major axis extends in the tire radial direction,
   the radial distance (h) between the tire equator point (P) and the maximum tire section width point (D) is more than 34% but less than 50% of the tire section height (H).

2. The run-flat tire according to claim 1, wherein
   in a x-y coordinate system which is defined in a meridian section of the tire such that: y-axis extends radially outwardly on the tire equator; x-axis extends axially outwardly in the tire axial direction; and the x-y coordinates of said tire equator point (P) is (0, B), wheren B is a radius of curvature of the profile line at the tire equator point (P),
   the elliptic function of said ellipse is $$\frac{(x-a)^2}{a^2} + \frac{y^2}{b^2} = 1$$

wherein $0<a<b$.

3. The run-flat tire according to claim 1, wherein
   in a flat state in which the tire is mounted on the standard rim and loaded with the standard load but the pressure is zero, the inside of the tire is curved so that
   a radial line (T) passing an axial position corresponding to the rim width of the standard rim intersects the inside of the tire at a radially inner point (C1) and a radially outer point (C2), and
   the radial distance L between the radially inner point (C1) and outer point (C2) is more than 95% but less than 300% of the axial distance (N) from the radial line (T) to an axially outermost point (Q) on the inside of the tire.

4. The run-flat tire according to claim 1, which further comprises
   a breaker disposed radially outside the carcass ply in the tread portion, and
   a band disposed radially outside the breaker,
   said breaker comprises a radially inner ply and an radially outer ply being wider than the inner ply,
   said band is wider than the breaker.

5. The run-flat tire according to claim 4, wherein
   said carcass consists of said carcass ply which extends between the bead portions and is turned up around the bead core in each bead portion from the inside to the outside of the tire to form a pair of turnup portions and a main portion therebetween,
   the radially outer edge of each said turnup portion overlaps one of the axial edges of the breaker,
   said band is composed of spiral windings of a single aramid cord or a plurality of parallel aramid cords.

6. The run-flat tire according to claim 4, wherein
   a strip of rubber having a thickness of less than 1.5 mm and an axial width of more than 20 mm is disposed between the breaker and the band so as to cover each axial edge of the breaker.

* * * * *